US008364773B2

(12) United States Patent
Shuster (10) Patent No.: US 8,364,773 B2
(45) Date of Patent: *Jan. 29, 2013

(54) E-MAIL AUTHENTICATION (76) Inventor: Gary Stephen Shuster, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,696

(22) Filed: Feb. 27, 2012

(65) Prior Publication Data

US 2012/0158877 A1 Jun. 21, 2012

Related U.S. Application Data (63) Continuation of application No. 11/745,290, filed on May 7, 2007, now Pat. No. 8,126,971.

(51) Int. Cl.
*G06F 15/16* (2006.01)

(52) U.S. Cl. ........ 709/206; 709/201; 709/202; 709/203; 709/204

(58) Field of Classification Search .................... 709/206
See application file for complete search history.

(56) References Cited

U.S. PATENT DOCUMENTS

| 5,930,479 | A | 7/1999 | Hall |
| 5,999,932 | A | 12/1999 | Paul |
| 6,112,227 | A | 8/2000 | Heiner |
| 6,148,404 | A | 11/2000 | Yatsukawa |
| 6,230,188 | B1 * | 5/2001 | Marcus .......................... 709/206 |
| 6,405,243 | B1 * | 6/2002 | Nielsen ........................ 709/206 |
| 6,496,855 | B1 * | 12/2002 | Hunt et al. ..................... 709/202 |
| 6,546,416 | B1 | 4/2003 | Kirsch |
| 6,931,433 | B1 | 8/2005 | Ralston et al. |
| 7,003,546 | B1 * | 2/2006 | Cheah et al. .................. 709/203 |
| 7,149,778 | B1 | 12/2006 | Patel et al. |
| 7,155,608 | B1 | 12/2006 | Malik et al. |
| 7,188,360 | B2 | 3/2007 | Gerdes et al. |
| 7,917,943 | B1 | 3/2011 | Dreymann et al. |
| 2001/0049747 | A1 * | 12/2001 | Stanbach ....................... 709/245 |
| 2002/0023135 | A1 | 2/2002 | Shuster |
| 2003/0009698 | A1 | 1/2003 | Lindeman et al. |
| 2003/0167311 | A1 | 9/2003 | Kirsch |
| 2003/0204569 | A1 | 10/2003 | Andrews et al. |
| 2004/0003283 | A1 * | 1/2004 | Goodman et al. ............. 713/201 |

(Continued)

OTHER PUBLICATIONS

International Search Report and Written Opinion, PCT 2008/62919, International filing date: May 7, 2008—Cited in Parent U.S. Appl. No. 13/405,304.

(Continued)

*Primary Examiner* — Thu Nguyen
*Assistant Examiner* — Neeraj Utreja
(74) *Attorney, Agent, or Firm* — Novak Druce Connolly Bove & Quigg LLP; Jonathan Jaech (57) ABSTRACT

A system and method for determining whether an e-mail originates from a sender authorized by an address provider to send the e-mail to an intended recipient's e-mail address. The e-mail identifies an address provider from which the intended recipient's e-mail address was obtained. The e-mail is delivered to the intended recipient only upon verification that the sender is authorized by the address provider to obtain the intended recipient's e-mail address. The system and method may also provide for determining whether an e-mail originates from a forged source. A server receives data relating to an e-mail, including a purported sender and a verification host. The server queries the verification host with information pertaining to the e-mail and requests confirmation that the e-mail originates from the purported sender. The e-mail is determined to originate from a forged source unless the verification host responds that the e-mail originates from the purported sender.

20 Claims, 3 Drawing Sheets

U.S. PATENT DOCUMENTS

| | | | |
|---|---|---|---|
| 2004/0148330 A1* | 7/2004 | Alspector et al. | 709/200 |
| 2004/0181581 A1 | 9/2004 | Kosco | |
| 2004/0249895 A1 | 12/2004 | Way | |
| 2005/0021644 A1 | 1/2005 | Hancock | |
| 2005/0204159 A1 | 9/2005 | Davis et al. | |
| 2005/0239447 A1* | 10/2005 | Holzman et al. | 455/414.3 |
| 2006/0031464 A1 | 2/2006 | Bowman et al. | |
| 2006/0036690 A1 | 2/2006 | O'Neil | |
| 2007/0011253 A1 | 1/2007 | Taylor | |

OTHER PUBLICATIONS

Domain Name System, Wikipedia Foundation, Inc., enwikipedia.org, May 3, 2007, pp. 1-14—Cited in Parent U.S. Appl. No. 13/405,304.

MX Record, Wikipedia Foundation, Inc., enwikipedia.org, Apr. 30, 2007, pp. 1-3—Cited in Parent U.S. Appl. No. 13/405,304.

Sender Policy Framework, Wikipedia Foundation, Inc., enwikipedia.org, Apr. 27, 2007, pp. 1-8—Cited in Parent U.S. Appl. No. 13/405,304.

Wong, M. and Schlitt, W., "Sender Policy Framework (SPF) for Authorizing Use of Domain in E-Mail, Version 1", Network Working Group, The Internet Society (2006), pp. 1-48—Cited in Parent U.S. Appl. No. 13/405,304.

Crocker, D., "Standard for the Format of ARPA Internet Tex Messages", Department of Electrical Engineering, University of Delaware, Newark, DE, Aug. 13, 1982, pp. 1-49—Cited in Parent U.S. Appl. No. 13/405,304.

* cited by examiner

E-MAIL AUTHENTICATION

CROSS REFERENCE TO RELATED APPLICATION

This application is a continuation of application Ser. No. 11/745,290 filed May 7, 2007, now U.S. Pat. No. 8,126,971, which application is specifically incorporated herein, in its entirety, by reference.

BACKGROUND

1. Field

The present application relates to systems and methods for authenticating electronic communications that are transmitted through computer networks, and more particularly, to authenticating e-mails prior to delivery to the intended recipient.

2. Description of Related Art

Unsolicited, unwanted commercial e-mail messages, known commonly as "spam", comprise an increasing volume of e-mail traffic worldwide. At the same time, many consumers want to receive some unsolicited commercial e-mail relating to selected areas of interest. Such e-mail may include, for example, special offers, news or price reductions, news about new product releases, receipts of completed transactions, shipping notices, or other information of interest. Although various methods have been developed to block or filter spam before it reaches its intended recipients, a problem persists in determining exactly where to draw the line between unwanted spam and desirable commercial e-mail.

The need to distinguish between spam and legitimate commercial e-mail is especially important today, as more and more people rely on the Internet to conduct financial transactions and to make online purchases through a variety of commercial web sites. E-mails relating to these transactions, or e-mails from other authorized commercial sources, may be misclassified as spam and blocked from delivery to the intended recipients. Thus, spam blockers and filters may suffer from being either under inclusive or over inclusive as to the e-mails which are blocked as spam. In the first instance, the e-mail recipient may continue to receive a volume of spam e-mail, rendering the spam filter useless. In the second instance, however, the e-mail recipient may not receive legitimate e-mails which are misclassified as spam by virtue of their commercial nature.

Many spam blockers and filters have attempted to solve this problem by creating a targeted list of e-mail or IP addresses that are known to be used by senders of unwanted messages. These are known as "blacklists" and aid in blocking messages from the listed addresses. Blacklisting, however, can be readily evaded by the simple expedient of altering the sender's e-mail address. In addition, spammers may forge information contained in the e-mail, so that spam appears to originate from a legitimate source. Furthermore, spammers have increasingly sought to compromise the security of consumer and business computers to send spam from an enormous variety of IP addresses. Thus, targeted approaches that attempt to filter out spam based on its source are not as effective as desired.

Moreover, there is a need to distinguish between fraudulent and legitimate commercial e-mails. Fraudulent e-mail includes those in which the e-mail is forged or altered to appear to have originated from a source other than its actual source. There are no safeguards in normal Simple Mail Transfer Protocol (SMTP) to prevent such e-mails from being sent. Thus, spammers can send e-mails which purport to originate from senders that the intended recipient would ordinarily trust. This practice also allows spammers to avoid receiving non-delivery notifications (bounces) to their real addresses, fraudsters to cover their tracks and remain anonymous and phishers (password fishers) to impersonate well-known, trusted identities in order to steal passwords or other sensitive, personal information from users.

Various approaches have been proposed to prevent sender address forgery. One approach is Sender Policy Framework (SPF), an extension to SMTP which allows software to identify and reject forged addresses in the envelope sender address, e.g., SMTP MAIL FROM (Return-Path). SPF allows the owner of an Internet domain to use a special format of DNS TXT records to specify which hosts are authorized to transmit e-mails for a given domain. Thus, a receiving mail server performs a check to determine whether the e-mail comes from an authorized host. Typically, such checks are done by the receiving mail transfer agent, but can be performed elsewhere in the mail processing chain so long as the required information is available and reliable. SPF is further defined in RFC 4408.

One significant benefit of SPF is to those whose e-mail addresses are forged in the Return-Paths. They receive a large mass of unsolicited error messages and other auto-replies, making it difficult to use e-mail normally. If such people use SPF to specify their legitimate sending IPs with a FAIL result for all other IPs, then receivers checking SPF can reject forgeries, reducing the amount of back-scatter.

The SPF method, however, may be subject to certain vulnerabilities because it depends on the reliability of the DNS TXT records identifying authorized hosts and on the security of authorized hosts. Moreover, SPF normally only validates the domain of the envelope sender (in the Return-Path). Thus, domains that share mail senders (e.g. with virtual hosting) can forge each others' domain and SPF does not validate that a given e-mail actually comes from the claimed user, because it operates at the network level.

It would be therefore desirable to overcome these and other limitations of the prior art. Systems and methods are needed, which can distinguish between spam and legitimate commercial e-mail and, in certain embodiments, more effectively determine whether an e-mail originates from a forged source.

SUMMARY

The invention provides a system and method for determining whether an e-mail originates from an authorized sender. An authorized sender refers generally to one who obtains e-mail addresses from, and is authorized by, an address provider to send e-mails to one or more intended recipients. The address provider is thus a source of e-mail addresses, which the address provider may have obtained through a variety of methods. For example, an address provider may maintain a website which allows users to register their e-mail addresses for the purpose of receiving e-mails and also for the purpose of authorizing further distribution of their e-mail addresses to authorized senders. Many commercial sites currently operate in this manner, obtaining a customer's or subscriber's consent for receiving e-mails when a new user registers with the site. Such sites may therefore be "address providers" authorized to provide a recipient's e-mail address to authorized senders, optionally subject to limitations imposed by the recipient. Also optionally, the address provider may have an existing relationship with the recipient, for example, the recipient may be a past customer of the address provider. Thus, the address provider may be motivated to avoid authorizing excessive e-mail to the recipient, to avoid antagonizing the recipient or risking loss of a customer.

In accordance with the methods and systems disclosed herein, e-mails that are transmitted by an authorized sender may include information identifying the sender, the intended recipient, and the address provider from which the sender obtained the intended recipient's e-mail address. The e-mail may then be delivered to the intended recipient only after the address provider or an authentication server verifies that the sender was authorized by the address provider to send e-mails to the intended recipient.

In an embodiment of the invention, a method is provided for determining whether an e-mail to an intended recipient originates from an authorized sender. The method comprises receiving an e-mail directed to an intended recipient's e-mail address, wherein the e-mail includes information identifying a sender and an address provider from which the sender obtained the intended recipient's e-mail address; querying an authentication server to verify whether the sender is authorized by the address provider to send the e-mail to the intended recipient; and receiving a response from the authentication server. These method steps may be performed by a mail server for the intended recipient, a mail server for the sender, a network server, or by software residing on the client computer.

The e-mail may be delivered to the intended recipient if the response indicates that the sender is authorized by the address provider to send the e-mail to the intended recipient. The e-mail is not delivered, discarded, marked as spam, or segregated as spam if the response indicates that the sender is not authorized by the address provider to send the e-mail to the intended recipient.

The authentication server may be provided directly by the address provider or by a third party that is associated with the address provider and one or more different address providers. The address provider refers generally to the source from which the sender obtained the intended recipient's e-mail address. Accordingly, in instances where the sender obtains e-mail addresses directly from the intended recipients, the sender is also the address provider. In instances where the sender obtains e-mail addresses from another party, the sender and the address provider are two different entities. In both instances, the sender is authorized by the intended recipient, either directly or indirectly through an address provider, to direct e-mail to the recipient.

In accordance with one embodiment, the authentication server may be provided directly by the address provider. In an aspect of this embodiment, the authentication server accesses a database comprising a first list of client e-mail addresses and determines whether the intended recipient's e-mail address is on the first list of client e-mail addresses. If the intended recipient's e-mail address is on the first list of client e-mail addresses, the address provider issues a response indicating that the sender is an authorized sender. On the other hand, if the intended recipient's e-mail address is not on the first list of client e-mail addresses, the address provider issues a response indicating that the sender is not an authorized.

In another aspect of this embodiment, the authentication server accesses a database comprising a second list of approved senders. The authentication server determines whether the sender is on the second list of approved senders. If the sender is on the second list of approved senders, the authentication server issues a response indicating that the sender is an authorized sender. On the other hand, if the sender is not on the second list of approved senders, the authentication server issues a response indicating that the sender is not an authorized sender.

In accordance with another embodiment, the authentication server may be provided by a third party that is associated with the address provider and one or more different address providers. In accordance with this embodiment, the authentication server may first select and access the databases that are associated with the address provider identified in the e-mail. Again, the database may comprise a first list of client e-mail addresses, a second list of approved senders, or both first and second lists. The authentication server then determines if the intended recipient is identified on the first list of client e-mail addresses, if the sender is identified on the second list of approved senders, or both. Once the authentication server makes this determination, a suitable response is issued by the authentication server.

There are advantages to having the address source identified in the e-mail. The identity of the address provider is no longer hidden. Thus, it allows e-mail recipients to monitor an address provider's distribution of their e-mail address to other parties and to police against any uncontrolled or unauthorized distribution of their e-mail address. For example, a user may have registered his e-mail with an address provider and authorized the distribution of his e-mail address to a specific group of senders or other predefined scope, such as subject matter or interest groups. Thus, if the user receives e-mails which are outside the user's predefined scope, the user will be able to identify the source of such e-mails. This, in turn, will also encourage the address provider to distribute e-mail addresses more responsibly or risk losing its customers or clients.

E-mails may be altered or forged to appear as if they originate from an authorized sender or other legitimate source. This may be accomplished in a number of ways, such as changing the "FROM" e-mail header to identify an authorized sender or other legitimate source instead of the actual source. It may therefore be desirable to perform additional steps of authenticating that the e-mail actually originates from the sender or source identified in the e-mail, preferably before delivering the e-mail to the intended recipient.

Thus, in another embodiment of the invention, a method is provided for determining whether at least one e-mail originates from a forged source. In accordance with this embodiment, forged e-mail, e-mails sent from compromised computers, and the like, are considered as not being sent from the purported source and the delivery of such e-mails to the intended recipients is blocked or otherwise prevented.

In accordance with one aspect of this embodiment, a mail server receives data pertaining to at least one e-mail directed to at least one intended recipient, wherein the data includes information identifying a purported sender and a verification host. The data may be included in the e-mail envelope, header, or body. Optionally, the data may be provided separate from the e-mail or any part of the e-mail. The information identifying the purported sender may include any one or more of an e-mail address, a domain name, and an IP address. The verification host may be a server associated with the purported sender or a third party server authorized by the purported source.

The mail server then queries the verification host to confirm that the at least one e-mail originates from the purported sender. The query includes information identifying at least one e-mail and may include any one or more of the following: a hash value, a checksum, a digest of the e-mail, an authorization code, and at least a portion of the e-mail envelope, header or body.

The mail server then receives a response from the verification host that indicates whether or not the at least one e-mail originates from the purported sender. The e-mail is determined to originate from a forged source unless the response received from the verification host indicates that the e-mail originates from the purported sender.

In accordance with one aspect of the embodiment, if no response is received from the verification host within a predetermined time period or a predetermined number of query attempts, the e-mail is treated as originating from a forged source. The predetermined time period may be any set time period, ranging from 1 minute to 24 hours and the predetermined number of query attempts may range from 1 attempt to 100 attempts. If no reply is received within the predetermined time period or number of query attempts, or if the e-mail is returned as a bounce, normal delivery of the original e-mail is prevented. For example, the e-mail may be delivered to a "suspected spam" folder or discarded entirely.

The method may further comprise a step of determining the identity of hosts authorized to transmit e-mails for the purported sender and determining whether the at least one e-mail is being transmitted from an authorized host. Delivery of the e-mail to the intended recipient may be prevented if the at least one e-mail is not being transmitted from an authorized host.

In yet another embodiment, a system may be provided for authenticating the dispersal of an intended recipient's e-mail address from an address provider to a sender. The system comprises a mail server for receiving an e-mail directed to an intended recipient's e-mail address, wherein the e-mail includes information identifying the sender, the intended recipient, and the address provider from which the sender obtained the intended recipient's e-mail address; an authentication server accessible by the mail server, wherein the authentication server receives and responds to queries from the mail server; and a database accessible by the authentication server, wherein the database comprises information that permits the authentication server to determine whether the sender is authorized by the address provider to obtain the intended recipient's e-mail address. The address provider that provided the recipient's e-mail address may be identified in any one or more from the group consisting of: the e-mail header, subject line, and body.

In an aspect of this embodiment, the database information comprises a first list of client e-mail addresses associated with the address provider, wherein the dispersal of the intended recipient's e-mail address from an address provider to a sender is authorized if the intended recipient's e-mail address is on the first list.

In another aspect of this embodiment, the database information comprises a second list of approved senders associated with the address provider, wherein the dispersal of the intended recipient's e-mail address from an address provider to a sender is authorized if the sender is on the second list.

In addition, a method is provided for determining whether or not an e-mail originates from the sender listed in the e-mail header; i.e., determining whether or not the return address information has been forged. The method comprises receiving an e-mail directed to the intended recipient's e-mail address, wherein the e-mail includes information identifying a sender; and submitting a request to the sender requesting a return confirmation of sending the e-mail to the intended recipient's e-mail address. The e-mail is determined to originate from a forged address provider unless the return confirmation is received from the sender within a predetermined time period or query attempts.

In an aspect of this embodiment, the information identifying the sender may be selected from the group consisting of: an IP address associated with the sender and an e-mail address associated with the sender.

In another aspect, the request to the listed sender may comprise providing a hash value or checksum for the e-mail and requesting that the sender confirm sending the e-mail with the same hash value or checksum.

Other objects, features and advantages of the technologies disclosed herein will become apparent to those skilled in the art from the following detailed description.

BRIEF DESCRIPTION OF THE DRAWINGS

Like numerals refer to like parts throughout the several views of the drawings.

DETAILED DESCRIPTION

A system and method are described herein for determining whether an e-mail originates from a sender who is authorized by an address provider to send the e-mail to an intended recipient's e-mail address. Also disclosed herein are a system and method for determining whether an e-mail originates from a forged sender.

Although embodiments will be described herein in the context of certain e-mail standards set forth by the Internet Engineering Task Force (IETF), it is understood that the technology is not restricted to such standards. Examples of pertinent Request for Comments ("RFCs"), which define these e-mail standards, include but are not limited to as such as the Standard for the Format of ARPA Internet Text Messages (RFC822); Internet Message Format (RFC2822); and Simple Mail Transfer Protocol (RFC821/2821). The RFCs that define e-mail standards are available on the Internet through the IETF web site (www.ietf.org).

An e-mail generally consists of an envelope that represents the SMTP transaction, a header, and a body containing the actual text of the message and any attachments. The envelope is used internally by the Message Transfer Agent (MTA) to route the message. The MTA is the server software used to transfer e-mail over the network. The header includes information relating to the transmission of the e-mail, such as Date, From, To, or BCC. Other fields include Subject, CC, Reply-To, Received, Message-Id. The body represents the actual content of the e-mail message. The e-mails that are transmitted by an authorized sender include information that identifies the sender, the intended recipient, and the address provider from which the sender obtained the intended recipient's e-mail address.

A sender may obtain an e-mail address through a variety of methods and sources. The sender may obtain an e-mail address directly from the intended recipient by, for example, enabling users to register their e-mail addresses on a web site that is associated with the e-mail sender. The sender may also obtain e-mail addresses from address providers. For example, an address provider may have a feature on its web site that allows users to register and provide their e-mail addresses for future communications regarding that company's products or services and indicate whether he authorizes the address provider to provide his e-mail to certain other affiliates. If the user authorizes the distribution of his e-mail, then these other affiliates may become authorized senders.

Figure 1:
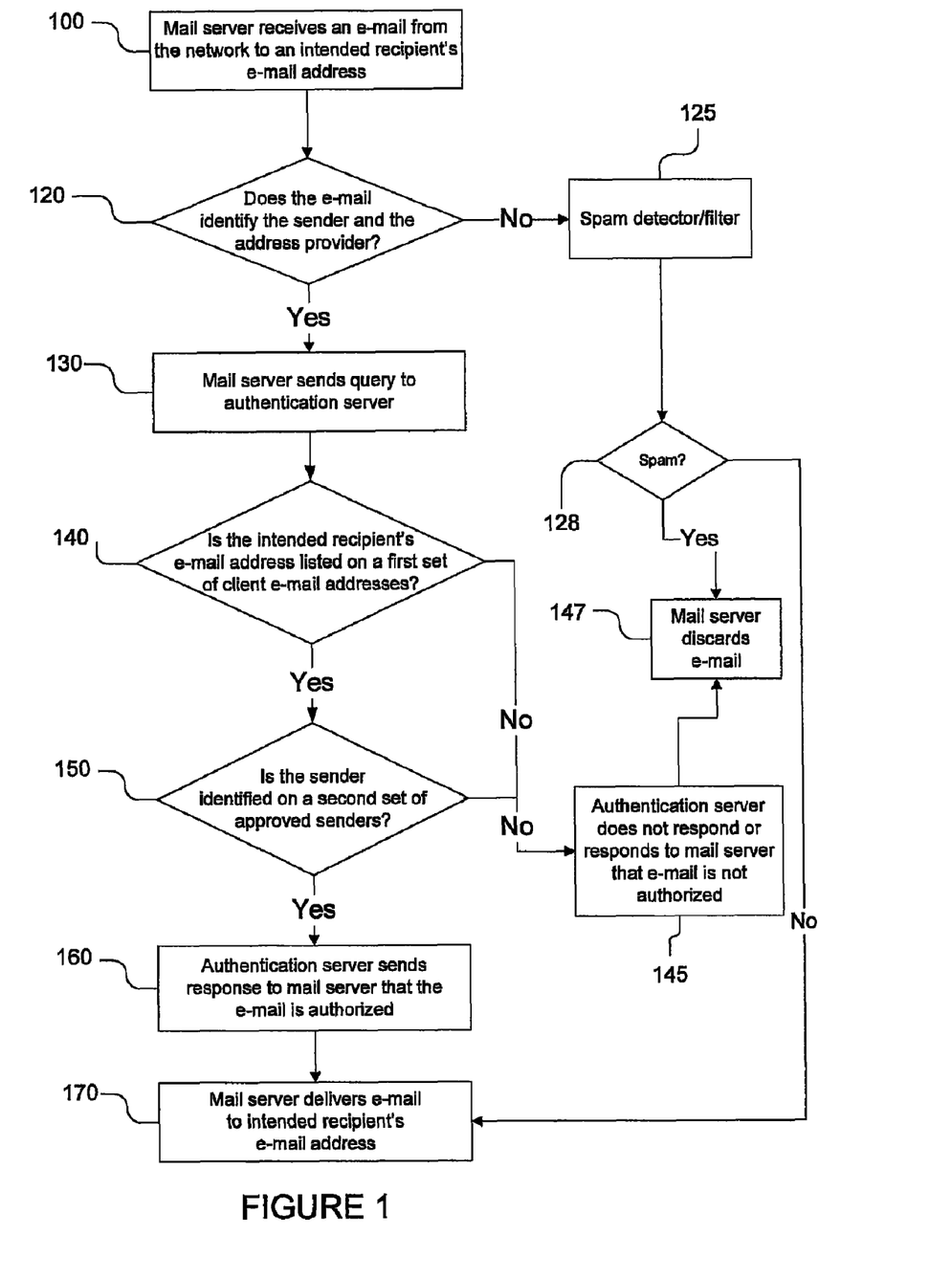
FIG. 1 is a flow diagram showing exemplary steps of a method for determining whether or not an unsolicited incoming message has been authorized by an address provider.

FIG. 1 show exemplary steps of a method for determining whether or not an unsolicited incoming message has been authorized by an address provider. Although the methods and systems are described as being performed by a mail server for the intended recipient, it is understood that the methods and systems may also be performed and used in connection with the mail server for the sender, client-based software, server-based software, network appliances, and third party services.

As depicted in FIG. 1, the mail server receives an e-mail from the network to an intended recipient's e-mail address 100. The mail server may then determine whether the e-mail identifies the sender and the address provider from which the sender obtained the intended recipient's e-mail address 120. The mail server may be configured to distinguish e-mails which identify an address provider from e-mails that are either from an unrecognized source or do not include information identifying an address provider. Generally, if the sender is recognized as an approved message source, it will not be necessary to determine whether or not an address provider in identified. For example, if the e-mail client recognizes e-mail from joesmith@aol.com as from an approved source, it is not necessary to determine who provided this sender with the recipient's e-mail address. By the same token, if the e-mail comes from an unrecognized source such as sales@acmecorp.com, then it may be advantageous to determine where this sender obtained the recipient's address. Step 100 may, in the alternative or in addition, be performed by a client-side application or by any application operative to process received e-mail at any point before it is delivered to a client's local or remote e-mail inbox.

Typically, the sender is identified in the "FROM" or "SENDER" fields in the e-mail header and the intended recipient is identified in the "TO", "CC" or "BCC" fields in the e-mail header. The address provider may be identified in any number of ways in the e-mail.

In accordance with one aspect of the preferred embodiments, the address provider may be identified in an additional user-defined field that is added to the e-mail header. User-defined fields may have names which are not already in use in any definitions of extension fields, and the overall syntax of the user-defined fields may conform to the relevant RFC822/2822 specifications. In accordance with another aspect of the preferred embodiments, the address provider may be identified in the e-mail header, subject line, or body and separated by machine-readable character delimiters so as to permit ready identification of the address provider.

If the e-mail includes information identifying the address provider, the mail server may contact the address provider or other designated authentication server to determine whether the e-mail is, in fact, authorized 130. An address for the authentication server may be included in the e-mail, or may be elsewhere defined for the mail server or mail client to whom the e-mail is directed.

In one embodiment, the address provider serves as the authentication server for e-mails in which the address provider is identified. The first query may comprise requesting that the authentication server determine whether the intended recipient's e-mail address is found in a database of client e-mail addresses that is associated with the address provider 140. The second query may consist of requesting that the authentication server determine whether the sender's e-mail address is found in a database of approved senders associated with the address provider 150. Either or both first and second queries may be performed before the authentication server sends its response 160.

In another embodiment, a third party authentication server may be used to authenticate e-mails in which the address provider is identified, wherein the third party authentication server is associated with the address provider and one or more different address providers. In accordance with this embodiment, the third party authentication server maintains separate databases for each address provider. Thus, when a third party authentication server receives a query to authenticate an e-mail, the third party authentication server accesses the appropriate database associated with the address provider identified in the queried e-mail. The database associated with the address provider may comprise a list of client e-mail addresses associated with the address provider, a list of approved senders associated with the address provider, or both. Thus, an e-mail is authenticated if the intended recipient is found on the list of client e-mail addresses associated with the address provider, if the sender is found on the list of approved senders associated with the address provider, or both.

If the authentication server communicates a response to the mail server that the e-mail is authorized 160, the mail server will then cause the e-mail to be delivered to the intended recipient's e-mail address 170. If the authentication server communicates a response that the e-mail is not authorized or if the authentication does not respond within a predetermined period of time or query attempts by the mail server 145, the mail server will then take a different action, such as deleting the e-mail, preventing the delivery of the e-mail to the intended recipient, or marking or segregating the e-mail as spam such as by placing it in a spam folder 147.

In the event that the e-mail received by the mail server does not identify both the sender and the address provider, the mail server may then subject the e-mail to a conventional spam detector/filter program 125. If the e-mail is determined to be spam 128, the e-mail may be discarded 147. If, however, the e-mail is not determined to be spam, the mail server may deliver the e-mail to the intended recipient's e-mail address 170. A advantage of the foregoing method is that users may receive unsolicited e-mail, such as commercial spam, without being inundated by unwanted spam from completely unknown and unverified senders. In addition, mail recipients are thereby able to trace the source of the address provider for accepted spam mail.

Figure 2:
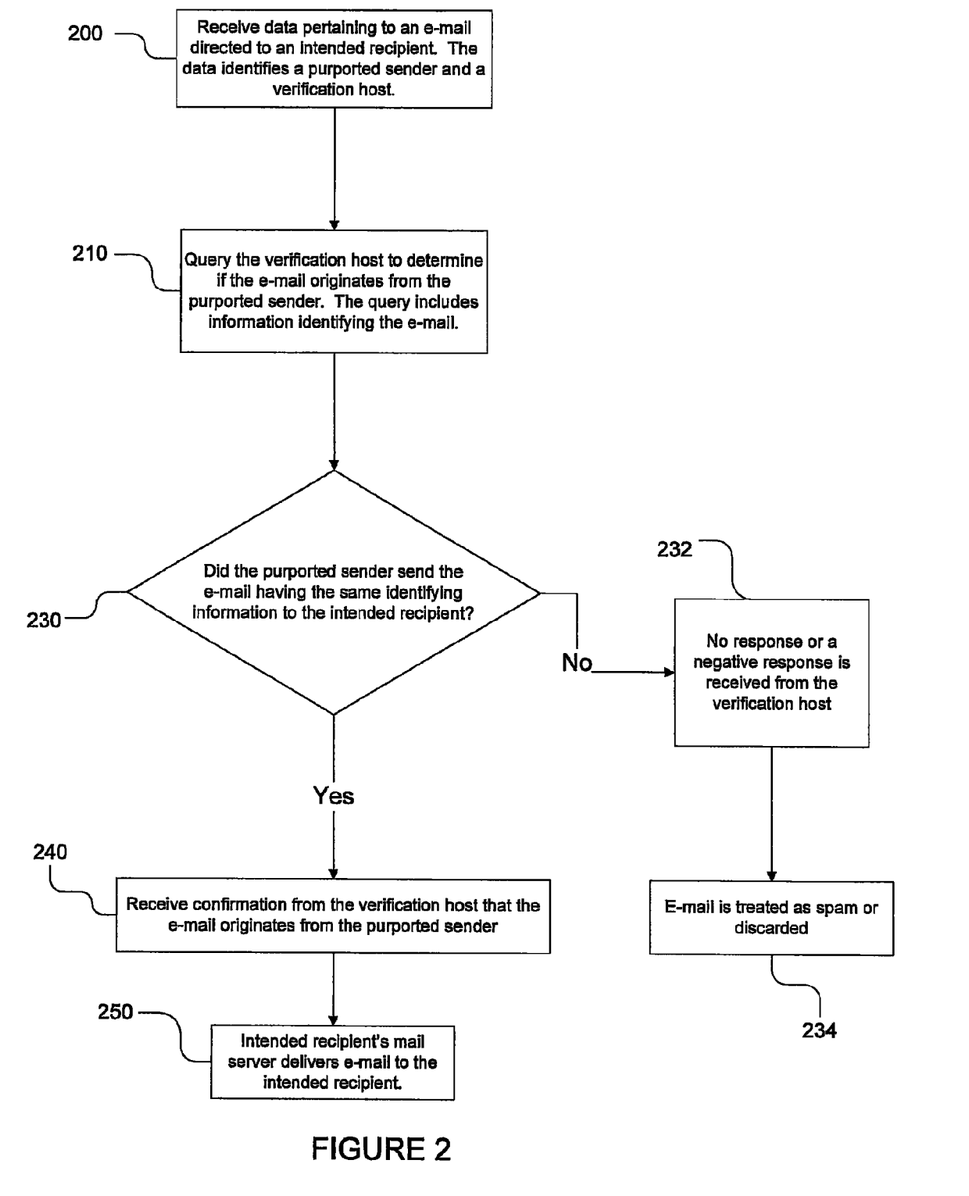
FIG. 2 is a flow diagram showing exemplary steps of a method for determining whether or not a listed sender of an incoming message is forged.

FIG. 2 is a flow diagram showing exemplary steps of a method for determining whether or not a listed sender of an incoming message is forged. This method may be applied in combination with the method shown in FIG. 1. For example, if a particular sender is approved via the method of FIG. 1 or otherwise recognized as an approved sender, it may still be advantageous to determine whether or not the return address indicated in the e-mail is genuine. The flow diagram depicts a method for determining whether an e-mail originates from a forged sender and may be performed at any point during, after, before, or instead of the execution of the method depicted in FIG. 1, but before delivering the e-mail to the intended recipient's e-mail address (FIG. 1, 170).

A mail server receives data pertaining to an e-mail directed to an intended recipient 200. This data includes information identifying a purported sender and a verification host. The data may be included in the e-mail envelope, header, or body. Optionally, the data may be provided separate from the e-mail or any part of the e-mail. The information identifying the purported sender may be any one or a combination of an e-mail address, a domain name, an IP address, and any other information which can be traced back to the sender.

The mail server then queries the verification host to determine if the e-mail originates from the purported sender 210. The step of querying and receiving a response from the verification host may conducted over a two-way transmission channel, such as Transmission Control Protocol (TCP/IP), User Datagram Protocol (UDP), SCTP, and the like, via a transmission. Other communication modes may include e-mail or any other synchronous or asynchronous communication method. The query typically includes information identifying the e-mail. This information may have been included with the original e-mail, such as an authorization code or at least a portion of the text contained in the envelope, header or body of the e-mail. Alternatively, this information may be separately generated by the mail server based on data contained in the e-mail, such as a hash value or checksum based on the e-mail, or a digest of the e-mail. A hash value or checksum may, for example, be generated based on the entire e-mail or based on the e-mail message, subject line, or other fields contained in the e-mail. It should be noted, however, that e-mail headers are often altered in transmission. Thus, hash values, checksums, and other values generated based on the e-mail would preferably exclude the headers or include only those headers generated up to a certain point in the transmission process or in time.

A hash value is obtained by converting e-mail data into a numerical value that may serve as a digital "fingerprint" of the e-mail. A fundamental property of all hash functions is that if two hashes (according to the same function) are different, then the two inputs are different in some way. If a hash value is calculated for a piece of data, and then one bit of that data is changed, a hash function with a strong mixing property usually produces a completely different hash value. Various suitable ways or determining a hash value are known in the art, and any suitable method may be used.

A checksum is a short piece of data that is added so that the receiver can check to see if the message was distorted during transmission. An MD5 algorithm may be used to generate a hash value that is used as a checksum. Accordingly, in one embodiment, a server can later perform the same operation on data, compare the result to the queried checksum, and determine whether the e-mail is identical.

Once the verification host receives the query from the mail server, the verification host determines whether the purported sender sent an e-mail having the same identifying information 230 and transmits a response to the mail server. If the verification host finds a match and thus indicates the e-mail originates from the purported sender, then the verification host may transmit a confirmation to the intended recipient's mail server that the sender of the e-mail is not forged 240. The intended recipient's mail server then delivers the e-mail to the intended recipient 250. On the other hand, if the verification host does not find a match and thus indicates that such an e-mail was not sent 232, then the verification host may transmit a confirmation to the intended recipient's mail server that the sender of the e-mail is not found, optionally indicating that the e-mail may be forged 240. The intended recipient's mail server may then discard the e-mail or otherwise prevent normal delivery to the intended recipient, such as by marking it as spam or placing it in a spam folder 234.

In a preferred embodiment, the verification host is a server associated with the purported sender or a third party server authorized by the purported sender. Where the verification host is a third party server, the verification host may provide the sender verification service not only the purported sender but additionally other entities that wish to institute the protections afforded by the disclosed methods against forged e-mails. The verification host may maintain or analyze sent e-mails, and generate a database of identifying information that uniquely identifies sent e-mails. For example, the verification host may store identifying information relating to sent e-mails and generate hash values or checksums associated with the sent e-mails, the e-mail date and time, the recipient address, or some combination of the foregoing or other information. Again, because e-mail headers are often altered in transmission, hash values, checksums, and other values generated based on the e-mail would preferably exclude the headers or include only those headers generated up to a certain point in the transmission process or in time. Thus, when a verification host receives a query from a mail server, the verification host may determine whether the information contained in the query, i.e., the identity of the intended recipient and the hash value or checksum generated for the e-mail, etc., can be matched up with the information contained in a data table of hash values or checksums for sent e-mails.

Optionally, the method disclosed in FIG. 2 may be supplemented with a further check to determine whether the e-mail was transmitted by hosts which are authorized to transmit e-mails from the purported sender. Information relating to authorized hosts may be obtained by querying DNS records. Once this information is obtained, the mail server may determine whether the e-mail is being transmitted from one of the authorized hosts identified in the DNS records. If the e-mail is not being transmitted by an authorized host, the mail server may prevent delivery of the e-mail to the intended recipient.

In accordance with a further aspect of the embodiment, the method may be used to verify a plurality of e-mails in bulk. The plurality of e-mails may originate from the same source or from a plurality of sources that are serviced by the same verification host. Delivery of the plurality of e-mails to the intended recipient may be allowed if every one of the plurality of e-mails is not determined to originate from a forged source. If the response from the verification host indicates that the at least one of the plurality of e-mails does not originate from the purported sender, then the plurality of e-mails is divided into a plurality of groups and the verification host may again be queried to confirm that the e-mails in the plurality of groups originates from the purported senders. Grouping of e-mail verification in this manner may reduce communication bandwidth required for anti-forgery detection.

Verification may be initiated at some level higher than the ultimate addressee. For example, verification may be performed by a post office server receiving mail for multiple clients. Any mail determined to not have a genuine sender may be flagged by the post office before delivering to the client mailboxes, or simply discarded.

Figure 3:
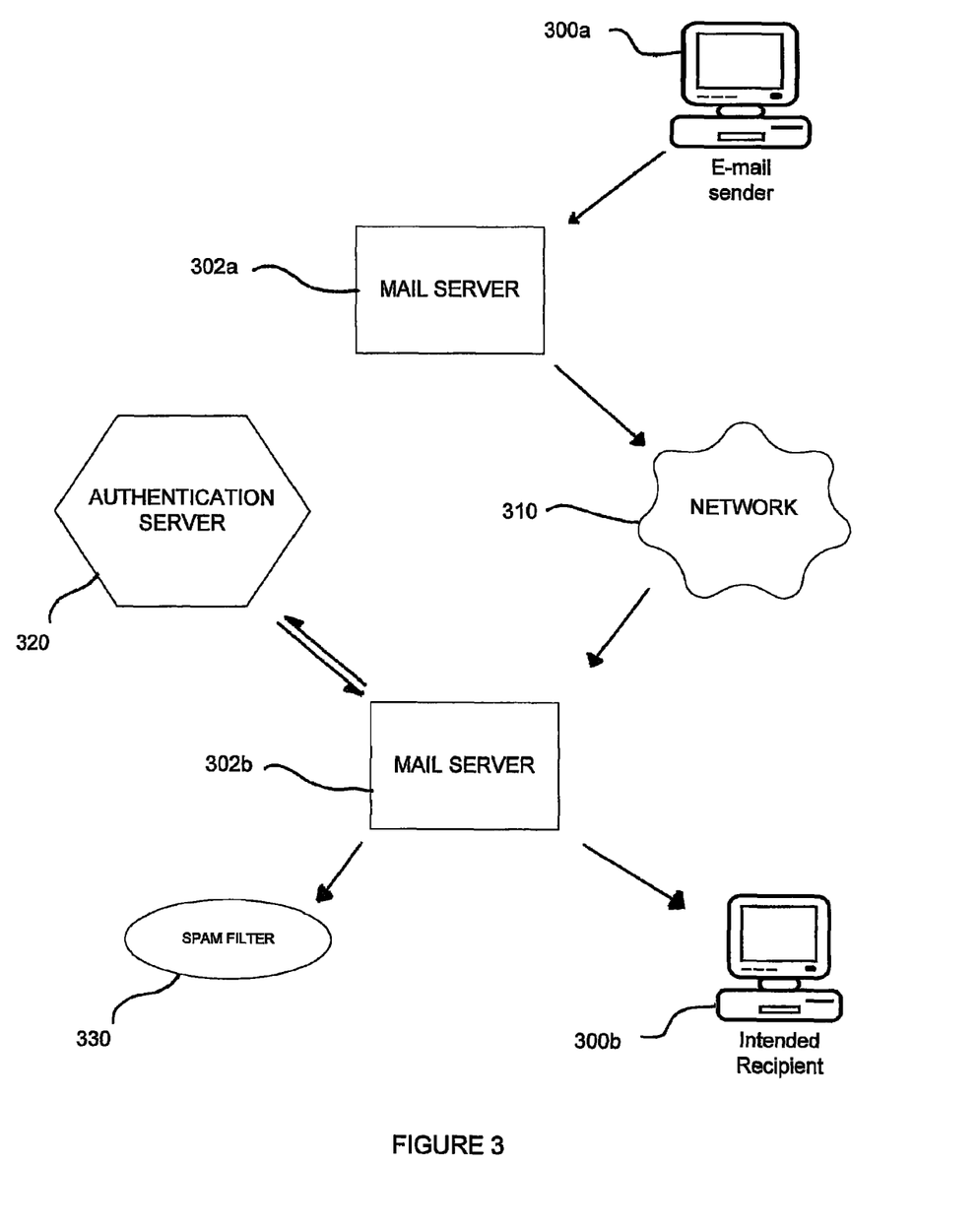
FIG. 3 is a block diagram showing an exemplary e-mail authentication system for performing the methods disclosed herein.

FIG. 3 is a block diagram showing the e-mail authentication system in accordance with an embodiment of the invention. E-mail messages are typically composed by an application running on a client machine 300a. One standard for e-mail formats may be described by RFC 822 or by RFC2822, which are a standard and a proposed standard, respectively, promulgated by IETF. When composition of the message is completed, the user uploads the completed message to a mail server 302a. The mail server 302a in one embodiment is owned by an Internet Service Provider (ISP) or by a private corporation for whom the user works. The user client machine 300a connects to the mail server 302a via dial-up, digital subscriber loop (DSL), cable Internet, or by other appropriate connection.

Very commonly, the destination computer 300b is a basic workstation and does not itself include a mail server function. Thus, it cannot fully support the Simple Mail Transport Protocol ("SMTP") message routing protocol. In these cases, the destination computer periodically queries its assigned mail server 302b and retrieves its mail messages from its mailbox on the mail server. A common protocol used to receive these mailbox messages from the mail server is the Post Office Protocol, version 3 (POPS). This protocol is defined in RFC1339.

Thus, as depicted in FIG. 3, an e-mail from the e-mail sender 300a may be transmitted from the sending mail server 302a, to the network 310 and to the receiving mail server 302b in accordance with RFC821, or by RFC 2821, which are also a standard and a proposed standard, respectively, of the IETF. The RFC 821 and RFC 2821 documents describe the SMTP, which is the protocol by which e-mail messages have typically been transported over the Internet. Once the e-mail is received by the receiving mail server 302b, the e-mail may be evaluated by the server to determine whether it contains an identification of the sender and/or the address provider. If the e-mail does not identify a valid sender, or if it identifies a sender but no address provider, then it may be disposed of as spam, either before or after being further processed by a conventional spam detector/filter program 330. If the e-mail does, however, identify the sender and the address provider, or identifies a sender for which no address provider is needed, then the mail server 302b may query an authentication server to determine whether the e-mail originates from an authorized sender or whether the return address is genuine.

The authentication server 320 may have access to a database for client e-mail addresses and approved senders that are associated with the address providers. In one embodiment, the authentication server 320 may be operated by the address provider. In another embodiment, the authentication server may be a third party that maintains separate databases associated with different address providers. In either of these embodiments, the authentication server may be accessed by directing a query to the address provider, which may be redirected to the authentication server. In the alternative, queries may be sent directly to the authentication server. The authentication server 320 may receive queries from the intended recipient's mail server 302b, access the appropriate database to determine whether an intended recipient's e-mail address is found on the client e-mail addresses or whether a sender is identified as an approved sender, and respond to the mail server 302b. The e-mail may be delivered to the intended recipient 300b if the authentication server 320 communicates a response to the mail server 302b indicating that the e-mail is authorized.

In accordance with another embodiment, an independent determination may be made before the e-mail is delivered to the intended recipient 300b. Once an e-mail is determined to originate from an authorized sender, a further check may be conducted to ensure that the e-mail actually originates from the authorized sender. Thus, the method outlined in FIG. 2 may be conducted to determine whether or not a return address is not genuine. The mail server 302b generates a hash value, checksum or other identifying information based on the e-mail received from the sender and queries the mail server 302a or the sender 300a requesting a return confirmation of sending the e-mail based on the hash value, checksum, or other identifying information. If a confirmation is received by the mail server 302b, the e-mail may be sent to the intended recipient 300b. If no response or a negative response is received by the mail server 302b, then the e-mail may be discarded.

The invention described and claimed herein is not to be limited in scope by the specific preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A method for processing an incoming e-mail, the method comprising:
   receiving, by at least one computer, an e-mail directed to an intended recipient's e-mail address;
   identifying, by the at least one computer, a sender of the e-mail based on a first identifier included in the e-mail;
   identifying, by the at least one computer, an address provider from which the sender obtained the intended recipient's e-mail address, based on a second identifier included in the e-mail, the address provider being distinct from the sender and from the intended recipient;
   determining, by querying an authentication resource using the at least one computer, whether the sender is authorized by the address provider to use the intended recipient's e-mail address for sending e-mail to the intended recipient;
   selecting, by the at least one computer, one of permitting delivery of the e-mail to the intended recipient or preventing normal delivery of the e-mail to the intended recipient, based on the determining.

2. The method of claim 1, further comprising identifying the authentication resource based on information included in the e-mail.

3. The method of claim 1, further comprising selecting the authentication resource based on the second identifier.

4. The method of claim 1, further comprising obtaining a network address for the authentication resource by querying the address provider.

5. The method of claim 1, wherein querying the authentication resource further comprises accessing a database comprising a first list of client e-mail addresses associated with the address provider or a second list of approved senders associated with the address provider.

6. The method of claim 1, wherein preventing normal delivery of the e-mail to the intended recipient further comprises an action selected from the group consisting of: discarding the e-mail, marking the e-mail as spam, and segregating the e-mail with spam.

7. The method of claim 1, further comprising requesting confirmation that the e-mail originates from the sender identified in the e-mail prior to delivering the e-mail to the intended recipient.

8. The method of claim 7, wherein requesting confirmation that the e-mail originates from the sender identified in the e-mail further comprises providing a hash value for the e-mail and requesting that the sender confirm sending the e-mail based on the hash value.

9. The method of claim 7, further comprising preventing normal delivery of the e-mail to the intended recipient in response to failing to confirm that the e-mail originates from the sender identified in the e-mail.

10. The method of claim 7, further comprising permitting delivery of the e-mail to the intended recipient based on determining that the sender is authorized by the address provider to use the intended recipient's e-mail address for sending e-mail to the intended recipient and on confirming that the e-mail originates from the sender identified in the e-mail.

11. An apparatus for processing an incoming e-mail, comprising a processor coupled to a memory, the memory holding program instructions, that when executed by the processor, cause the apparatus to perform the operations of:
receiving an e-mail directed to an intended recipient's e-mail address;
identifying a sender of the e-mail based on a first identifier included in the e-mail;
identifying an address provider from which the sender obtained the intended recipient's e-mail address, based on a second identifier included in the e-mail, the address provider being distinct from the sender and from the intended recipient;
determining, by querying an authentication resource, whether the sender is authorized by the address provider to use the intended recipient's e-mail address for sending e-mail to the intended recipient;
selecting one of delivering the e-mail to the intended recipient or preventing normal delivery of the e-mail to the intended recipient, based on the determining.

12. The apparatus of claim 11, wherein the memory holds further program instructions for identifying the authentication resource based on information included in the e-mail.

13. The apparatus of claim 11, wherein the memory holds further program instructions for selecting the authentication resource based on the second identifier.

14. The apparatus of claim 11, wherein the memory holds further program instructions for obtaining a network address for the authentication resource by querying the address provider.

15. The apparatus of claim 11, wherein the memory holds further program instructions for querying the authentication resource by accessing a database comprising a first list of client e-mail addresses associated with the address provider or a second list of approved senders associated with the address provider.

16. The apparatus of claim 11, wherein the memory holds further program instructions for preventing normal delivery of the e-mail to the intended recipient by an action selected from the group consisting of: discarding the e-mail, marking the e-mail as spam, and segregating the e-mail with spam.

17. The apparatus of claim 11, wherein the memory holds further program instructions for requesting confirmation that the e-mail originates from the sender identified in the e-mail prior to delivering the e-mail to the intended recipient.

18. The apparatus of claim 17, wherein the memory holds further program instructions for confirmation that the e-mail originates from the sender identified in the e-mail by providing a hash value for the e-mail and requesting that the sender confirm sending the e-mail based on the hash value.

19. The apparatus of claim 17, wherein the memory holds further program instructions for preventing normal delivery of the e-mail to the intended recipient in response to failing to confirm that the e-mail originates from the sender identified in the e-mail.

20. The apparatus of claim 17, wherein the memory holds further program instructions for delivering the e-mail to the intended recipient based on determining that the sender is authorized by the address provider to use the intended recipient's e-mail address for sending e-mail to the intended recipient and on confirming that the e-mail originates from the sender identified in the e-mail.

* * * * *